May 18, 1926.

C. L. GOODRUM 1,585,024

CONTROLLING MECHANISM FOR PROGRESSIVELY MOVABLE
ELECTRIC SWITCHES AND OTHER DEVICES

Original Filed Jan. 19, 1907    3 Sheets-Sheet 2

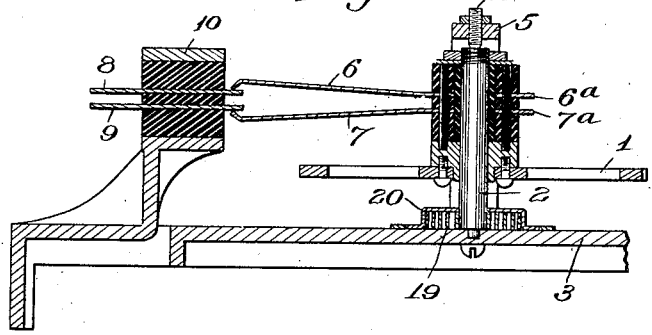
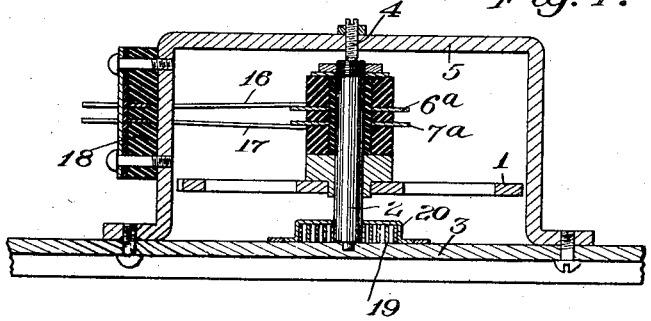

Patented May 18, 1926.

1,585,024

UNITED STATES PATENT OFFICE.

CHARLES L. GOODRUM, OF ROCHESTER, NEW YORK, ASSIGNOR, BY MESNE ASSIGNMENTS, TO WESTERN ELECTRIC COMPANY. INCORPORATED, A CORPORATION OF NEW YORK.

CONTROLLING MECHANISM FOR PROGRESSIVELY MOVABLE ELECTRIC SWITCHES AND OTHER DEVICES.

Application filed January 19, 1907, Serial No. 353,017. Renewed August 31, 1907. Serial No. 390,856.

My present invention relates to electric switches and other devices which are operated progressively and it has for its object to provide an improved mechanism for controlling such a device, whereby it may be operated a predetermined number of times, arrested and subsequently restored, the parts of which are so arranged for conjoint action that the device when arrested at the desired point is incapable of a further advance movement until it is restored.

My invention is related more specifically to the art of telephony and those switches employed in making the connections between the telephone lines of automatic telephone exchange systems and its further object is to provide in connection with such switches, a motor and release devices which may alternately be rendered operative to set the switch in a desired position of adjustment and subsequently restore it. The devices controlling these parts, as comprehended by this invention, are designed to be actuated by instruments on a telephone line and to control the movement of the motor device so that it may be actuated one or more times by one or more impulses of current transmitted successively over the telephone line and then arrested and rendered inoperative or unresponsive to further impulses, said mechanism then rendering the releasing devices capable of operation and permitting their actuation when it is desired to restore the switch to its normal position. To these and other ends the invention consists in certain improvements and combinations of parts, all as will be hereinafter more fully explained, the novel features being pointed out in the claims at the end of the specification.

In the drawings:

Figure 3 is a detail sectional view of said device taken on the line 3ˣ—3ˣ of Figure 2, and Figure 4 is a similar view taken on the line 4ˣ—4ˣ of Figure 2.

Similar reference numerals in the several figures indicate similar parts.

Figure 1:
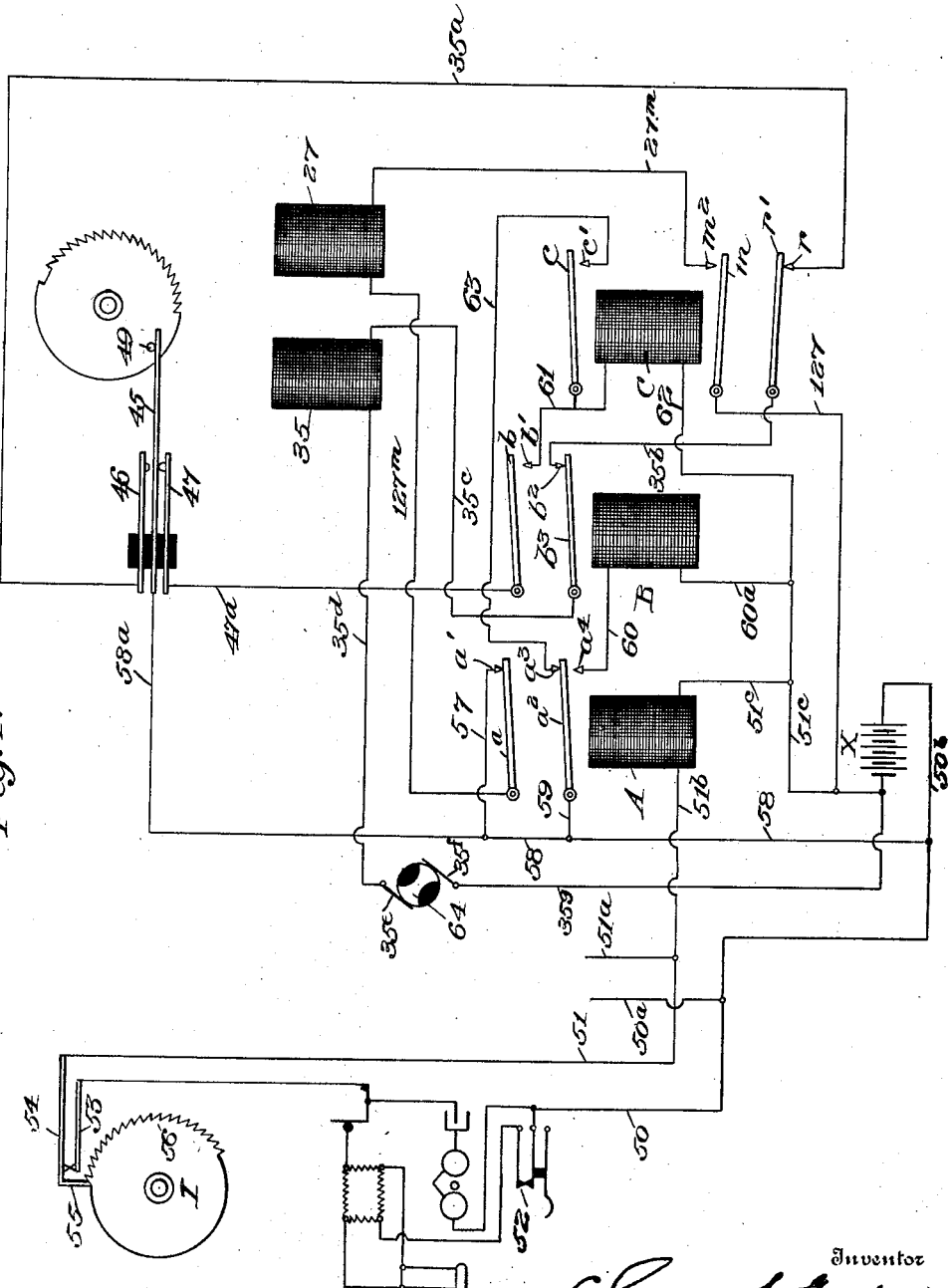
Figure 1 is a diagrammatic illustration of a controlling mechanism embodying my invention.

In illustrating my invention I have shown it employed in connection with and controlling the operation of a step-by-step device which in the present instance is shown as an electric switching mechanism employed for connecting two or more telephone lines. The switching mechanism, shown particularly in Figures 2, 3 and 4, comprises generally a progressively movable element 1 which is adapted to be advanced step-by-step, and to this end it is made circular in form and is mounted upon a revoluble shaft 2 journaled at its lower end in a base plate 3 and supported at its upper end by a set screw 4, carried in a bracket 5, the ends of which extend downwardly and are secured to the base plate, as shown in Figure 4. Carried on the movable element and insulated therefrom are contact springs or wipers 6 and 7, arranged one below the other, the outer ends of which are adapted to cooperate with a series of insulated terminal contacts 8 and 9 arranged in pairs, those of each pair being located in vertical alinement, and where the switch controls a plurality of telephone lines, these pairs of terminals are supported upon a bridge 10 and are arranged concentric with the center of movement of the wipers. The rear ends of the latter are provided with segments 6ᵃ—7ᵃ, with which cooperate brushes 16 and 17 supported in the holder 18, of insulating material, secured to one of the ends of the bracket 5. Connected to the lower end of the shaft 2 is a coil spring 19, arranged in a casing 20 to which its upper end is attached, the tension applied to the spring being sufficient to return the shaft and the parts supported thereon to the normal position, shown in Figure 2 when they are released.

Figure 2:
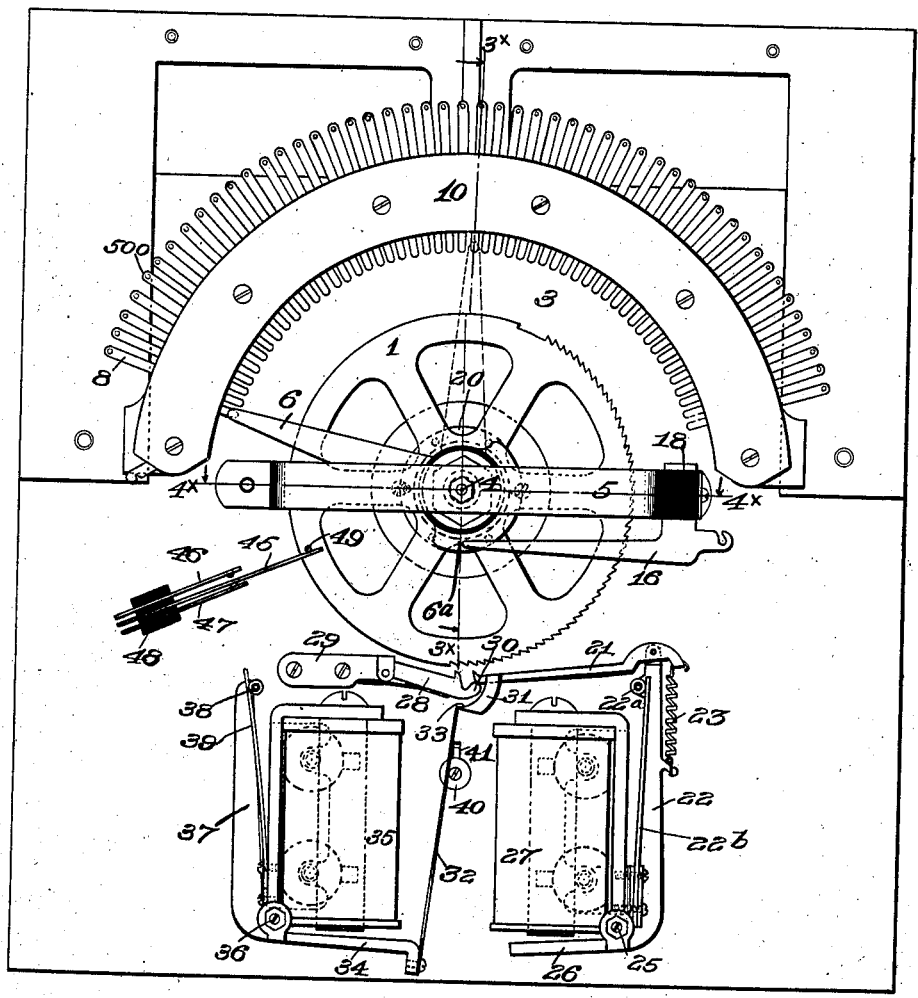
Figure 2 is a plan view of a step-by-step device illustrating a type of apparatus in connection with which the controlling mechanism may be employed, the operating parts of said mechanism being shown in detail.

The means for operating the movable element comprises a pawl 21 pivoted to the upper end of an arm 22 on which it is moved by a spring 23 into engagement with the serrations or teeth 24 on the periphery of the element 1. The arm 22 is pivoted at the point 25 and is provided with a laterally-extending end 26 forming an armature which cooperates with the motor magnet 27, employed for actuating the operating devices. Also carried on the arm is a stud 22ª against which bears the end of the spring 22ᵇ tending to move the arm in a direction to advance the element 1 and move the armature 26 into the inoperative position. The locking device is a spring operated detent 28, pivoted on the support 29 having at its outer end a finger 30 projecting beneath the end of the pawl 21 which is held loosely in proximity therewith by a lip 31 extending downwardly from said pawl. When the pawl 21 is retracted into an inoperative position, its outer end bears against the lip 30 and retracts the detent, as shown in Figure 2. The means for releasing the movable element comprises a latch member or trip 32 having an end 33 which is adapted to hook over the end of the lip 31. At its lower end the spring 32 is attached to an armature 34, adapted to be actuated by the release magnet 35, which is pivoted in proximity to the magnet, as indicated at 36. Attached to the armature and extending upwardly from the pivot is an arm 37, carrying at its end a pin 38 with which cooperates the leaf spring 39 which is adapted to oscillate the arm to retract the armature 34. Supported on the base plate 3 and in front of the spring 32 is a stud 40 which is adjustable in a slot 41 and is adapted to cooperate with the spring to limit its lateral movement when the armature to which it is connected is retracted. This stud is arranged in such a position that the hooked end of the spring arm 32 is permitted to engage the lip 31 when it is moved upwardly and to retain its engagement therewith when retracted to hold the pawl 21 in an inoperative position. From this arrangement of the parts it will be seen that the pawl 21 is always disengaged from the ratchet wheel or element 1 when the latter is in its normal position, and that as the arm 32 is prevented from moving laterally toward the pawl by the stud 40, the pawl will be disengaged therefrom and revolved into engagement with the element 1 by the spring 23 whenever the motor magnet 27 is energized. The movable element controls two circuits which will be described in connection with the diagrammatic illustration, which are formed by a contact spring 45 playing between contact members 46 and 47 supported on the base plate 3 by a holder 48 formed of insulating material. The spring 45 has a normal tendency to engage the contact 46 but is held in engagement with the contact 47, when the movable element is in its normal position, by a pin 49 mounted on the latter which releases said spring upon the first step or movement of the element 1.

In Figure 1 the motor and release magnets are shown diagrammatically in connection with other magnets or relays which control their operation, together with the circuit and devices thereon by means of which the step-by-step mechanism is operated. While this mechanism may be employed for purposes other than for use in connection with automatic telephone systems, it has been shown in connection with such a system to illustrate its adaptability thereto. Accordingly I have shown a telephone circuit comprising the wires 50, and 51 connected by branches 50ª and 51ª with the wipers 16 and 17 respectively, shown in Figures 2 and 4. The telephone circuit is provided with the usual receiver hook contacts 52 which are normally open when the circuit is not in use and also arranged in this circuit is a pair of normally closed contacts 53 and 54 one of which is mounted on a spring finger provided with an end 55 adapted to cooperate with teeth 56 of an impulse transmitter I, which is adapted to be rotated to transmit or send over the operating circuit one or more impulses of current when the latter is closed at the hook contacts 52. Any suitable form of device may be used for this purpose, although it is preferably to employ one which will insure the closing of the contacts 53 and 54 after the desired number of impulses have been transmitted over the line.

Associated with the release and motor magnets are two relays B and C, which may be termed respectively, the release magnet relay and the motor magnet relay, the operation of each of which is governed by a primary or controlling relay A. The cores of the magnets B and C are provided with a copper sheath, not shown, or are otherwise formed to give them a different time constant relatively to the controlling relay A, whereby the latter is enabled to govern the energizing and deenergizing of said relay magnets whereby contacts in a local circuit of the motor magnet may be controlled to permit said magnet to be operated successively in unison with a group of impulses transmitted over the operating circuit and then destroyed to prevent the operation of the motor magnet and render it inoperative to an impulse or group of impulses subsequently transmitted over the operating circuit. Another function ascribed to these relays is the control of the circuit of the release relay which prevents its operation until the operating circuit has been destroyed, but cuts it in to automatically restore the mechanism.

The quick or controlling relay A which responds to impulses of current with greater rapidity than the others, is connected to the operating circuit by wire 51ᵇ and to one side of the battery X by the wire 51ᶜ, the operating circuit being completed through the wire 50ᵇ which extends to the other side of said battery. This relay controls the movement of a spring arm $a$, cooperating with a terminal $a'$, of the branch 57 on the wire 58, attached to the wire $50^b$. It also controls the spring $a^2$ attached to the branch 59 leading from the wire 58 and normally engaging the back contact $a^3$. The spring $a^2$ is adapted to cooperate with a forward terminal $a^4$ of the wire 60 forming a part of the circuit of the release magnet relay B, said circuit being completed through the wire $60^a$. The motor relay magnet C controls a normally open set of contacts in the motor magnet circuit which are formed by a spring $m$ and the terminal $m^2$, of the wire $27^m$. The spring $m$ forms the terminal of the wire 127 which leads to one side of the battery. The motor magnet circuit is completed through the wire $127^m$ which is connected to the spring $a$. The release magnet relay B controls two sets of contacts, one of which is located in the starting circuit of the relay C and is adapted to be closed primarily to impart the first impulse to the movable element and the other set of contacts is arranged directly in the release magnet circuit and will be described more fully hereinafter, as it has a conjoint action with a set of normally closed contacts controlled by the relay C. The starting circuit of the relay C comprises the spring contact finger 45, which is connected with one side of the battery by the wire $58^a$ (a continuation of the wire 58) and the contact spring 47, joined by the wire $47^a$, with the normally open set of contacts on the relay B comprising the spring $b$ and the terminal $b'$. The latter is connected by the wire 61 with one of the terminals of the coil of the magnet C, the other terminal of said coil being extended, as indicated at 62, to wire $51^c$. A circuit is provided for holding the coil of the relay C energized at certain times which comprises a normally open set of contacts which are closed by said magnet itself. These are indicated as comprising a spring $c$ and a terminal $c'$ of the wire 63, the other extremity of which is connected to the contact $a^3$.

The circuit of the release magnet comprises the wire $35^a$, connected to the contact 46 and ending in the terminal $r$ of a normally closed set of contacts, embracing the spring $r'$, which are adapted to be opened by the energizing of the motor relay magnet C. The spring $r'$ is connected by the wire $35^b$ with the terminal $b^2$ of a normally closed set of contacts, embracing the spring $b^3$, which are adapted to be opened when the release relay magnet B is energized. The last mentioned spring is connected by the wire $35^c$ with one end of the coil of the release magnet 35. The other end of said coil is connected with the wire $35^d$ terminating in the brush $35^e$ contacting with a current interrupter 64 employed for interrupting the flow of current through said magnet, with which cooperates the brush $35^f$ in the battery wire $35^g$.

When the operator desires to actuate the step-by-step device, or selective switching mechanism, for connecting the operating circuit with another circuit connected to one of the pairs of contacts 8 and 9, supported on the bridge 10 of the switch, he first closes the operating circuit. If the latter is a telephone circuit, as shown in the illustrations, this is accomplished when the receiver hook contacts 52 are closed, which causes the controlling relay A to be energized over the following circuit; battery X, wires $50^b$, 50, contacts 52, 53 and 54, wires 51 and $51^b$, relay magnet A, wire $51^c$. The operation of the relay causes the springs $a$ and $a^2$ to be attracted, the latter closing the following circuit: battery X, wires $50^b$, 58, 59, spring $a^2$, contact $a^4$, wire 60, relay magnet B, wires $60^a$, $51^c$. The energizing of the relay magnet B opens the normally closed set of contacts $b^2$, $b^3$ in the release magnet circuit and closes the normally open set of contacts $b$, $b'$ in the starting circuit of the relay magnet C, causing current to flow as follows: battery X, wires $50^b$, 58, $58^a$, spring 45, contact 47, wire $47^a$, spring $b$, contact $b'$, wire 61, magnet C, wires 62, $51^c$. The energizing of the relay magnet C attracts the springs $c$, $m$ and $r'$, closing the normally open contacts in the motor magnet circuit and opening the normally closed contact in the release magnet circuit. The aforedescribed operations are effected almost simultaneously with the closing of the operating circuit and they remain in the positions described until said circuit is broken. If the operator desires to actuate the step-by-step mechanism to connect the wipers or brushes 6 and 7 with one or another of the pairs of contacts with which they cooperate, he effects the opening and closing of said circuit the desired number of times, to connect the wipers with the desired pair of line terminals, with sufficient rapidity to release the contacts $a$ and $a^2$ and to continue their vibration to successively open and close the motor magnet circuit, while the motor magnet relay is charged with current. For instance, if it is desired to make a connection with the pair of contacts designated by the numeral 500 in Figure 2, which is the fifth set of contacts, necessitating five steps of the movable element before the latter can engage them, the impulse transmitter I is operated to open and close the contacts 53 and 54 five times. The energizing of the motor relay magnet C closes the normally open set of contacts $m$ and $m^2$, but as the controlling relay A is also energized, this circuit was destroyed by the opening of the normally closed set of contacts $a$ and $a'$.

The attraction of the spring $a^2$ closed the circuit of the relay magnet B permitting the current to flow over the following path: battery X, wires $50^b$, 58, spring $a^2$, contact $a^4$, wire 60, magnet B, wires $60^a$ and $51^c$. The relay magnet B then closes the normally open set of contacts $b$, $b'$, of the starting circuit so that current is allowed to flow over the following path to energize the relay magnet C: battery X, wires $50^b$, 58, $58^a$, spring 45, contact 47, wire $47^a$, spring $b$, contact $b'$, wire 61, magnet C, wires 62 and $51^c$. The de-energizing of the controlling relay magnet A by the opening of the contacts 53 and 54, of the operating circuit, permits the springs $a$ and $a^2$ to assume their normal position, the former completing the following circuit: battery X, wires $50^b$, 58, 57, contact $a'$, spring $a$, wire $127^m$, magnet 27, wire $27^m$, terminal $m^2$, spring $m$, wire 127. The closing of this circuit causes the armature 26 of the motor magnet to be attracted and as this circuit is immediately broken the spring $22^b$ is permitted to actuate the arm 22 and cause the pawl 21 to actuate the movable element one step. The first step of the latter carries the pin 49 out of engagement with the spring 45 and breaks the starting circuit of the magnet C, but as the latter has a sluggish movement in comparison with the magnet A, it does not release the normally open contacts of the motor magnet circuit before the controlling circuit is again opened, consequently the magnet C is retained charged by current supplied to the holding circuit by the momentary engagement of the spring $a^2$ with the contact $a^3$, which occurs each time the controlling relay A is de-energized. This holding circuit may be traced as follows: battery X, wires $50^b$, 58, 59, spring $a^2$, contact $a^3$, wire 63, terminal $c'$, spring $c$, wire 61, magnet C, wires 62 and $51^c$.

When the last impulse has been transmitted over the operating circuit, the controlling relay holds the springs $a$ and $a^2$ attracted permitting the slower relay C to become deenergized and thus open the contacts $m$ and $m^2$ in the motor magnet circuit and springs $c$ and $c'$ in the starting circuit. This prevents the further operation of the motor magnet and the subsequent energizing of the motor magnet relay, as both the holding circuit and the starting circuit of the latter are now destroyed. These circuits being broken, the motor magnet is rendered inoperative and is consequently unaffected by additional impulses of current which would be transmitted over the operating circuit should the operator for any reason move his impulse transmitter 1 a second time, after setting up a connection and before restoring the switching mechanism to its normal position. The attraction of the spring $a^2$ supplying current to the release relay B opens the normally closed contacts $b^2$ and $b^3$, so that the circuit of the release magnet cannot be completed when the other opening therein is closed by the engagement of the spring $r'$ with the terminal $r$.

The restoring of the step-by-step devices is permitted when the operating circuit is opened permanently, as by the disengagement of the contacts 52, which permits the spring $a^2$ to assume its normal position and destroy the circuit of the relay magnet B. At this time the spring 45 is in engagement with the contact 46 and the current is permitted to flow over the following circuit: battery X, wires $50^b$, 58, $58^a$, spring 45, contact 46, wire $35^a$, contact $r$, spring $r'$, wire $35^b$, contact $b^2$, spring $b^3$, wire $35^c$, magnet 35, wire $35^d$, brushes $35^e$, $35^f$, current interrupter 64 and wire $35^g$. The current interrupter 64, which may be a rotary or other movable device, supplies an intermittent current to the magnet 35 with sufficient rapidity to cause a rapid movement of the armature 34 and reciprocation of the spring 32, which continues until the restoring spring 19 has revolved the element 1 to its normal position and caused the latter to automatically break the circuit of the restoring magnet 35 by disengaging the spring 45 from the contact 46.

The controlling mechanism embodying this invention is adapted for operating a step-by-step device employed for any purpose, and by virtue of the functions it possesses, said mechanism is especially adapted for the purposes described as the parts are capable of performing rapid movements with great precision. By making the relays of the release and motor magnet circuits so that they operate sluggishly with a relatively slower movement than the controlling relay an advantage is obtained, as it becomes possible to render the motor magnet operative a plurality of times in unison with successive impulses of current transmitted over the operating circuit at regular intervals of time, and to arrest the operation of the parts actuated by said magnet when an interruption in the transmission of said impulses occurs which is of sufficient duration to permit the current to be discharged from the slower relays, or one of them. In addition to the foregoing, the arrangement of the parts is such that the release devices are automatically set in position to be operated and are likewise rendered inoperative when they have performed their operation.

The motor device for advancing the movable element of the mechanism is normally inoperative and is governed by the action of the two switching relays A and C, which operate conjointly; the relay C serving to render the motor device operative and place it under the control of the relay A, whereby the latter may cause its actuation a desired number of times. The fact that the relay C is controlled primarily by the relay A and through the instrumentality of the relay B is removed from the influence of the relay A when the latter, after once commencing to vibrate its contact springs, ceases its operation, permits said relay C to act independently to render the motor device inoperative the moment a break or irregularity occurs in the transmission of successive current impulses to the relay A.

I claim as my invention:

1. In a step-by-step mechanism, the combination with a movable element, a motor magnet and means operated thereby for advancing said element successively, of a circuit for said magnet having normally closed and normally open sets of contacts, and a magnet for controlling the set of closed contacts, an operating circuit leading to the controlling magnet and means for sending impulses of current thereon, a relay controlling the set of normally open contacts, a circuit for said relay, means governed by the controlling magnet for energizing the relay and a source of current supply for said circuits.

2. In a step-by-step mechanism, the combination with a movable element, a motor magnet and means operated thereby for advancing said element successively, of a circuit for said magnet having normally closed and normally open sets of contacts, a magnet controlling the closed contacts and a relay controlling the open contacts, an operating circuit for the magnet and means for sending impulses of current thereover to alternately open and close the contacts controlled thereby, a circuit for the relay controlled by said magnet which is energized to maintain the contacts controlled by the relay in closed position during the energizing and de-energizing of said magnet.

3. In a step-by-step mechanism, the combination with a movable element, means for operating it, a motor magnet for actuating said means and a motor magnet circuit having normally open and normally closed sets of contacts, of an operating circuit, means for sending impulses of current thereover and a relay arranged in said circuit controlling the normally closed set of contacts, a secondary relay adapted to close the normally open set of contacts in the motor magnet circuit and a circuit for the secondary relay which is energized and retained in an energized condition during the operation of the controlling relay and a source of current supply for said circuits.

4. In a step-by-step mechanism, the combination with a movable element, means for operating it, a motor magnet for actuating said means and a local motor magnet circuit having normally open and normally closed sets of contacts, of an operating circuit, a relay arranged therein controlling the normally closed set of contacts and means for sending impulses of current over the operating circuit to successively open and close said contacts, a secondary relay for closing the normally open set of contacts in the motor magnet circuit, a circuit for the secondary relay and means actuated by the controlling relay for energizing said circuit and maintaining it in an energized condition during the operation of the other set of contacts and a source of current supply for said circuits.

5. In a step-by-step mechanism, the combination with a movable element, means for operating it, a motor magnet for actuating said means and a local circuit for said magnet having a set of normally closed contacts and a set of normally open contacts, of a relay controlling the normally closed contacts, a normally open operating circuit leading to said relay, means for closing it to cause the opening of the closed set of contacts, a device for subsequently transmitting impulses of current over said operating circuit, means actuated upon the closing of the operating circuit for closing the normally open set of contacts and a source of current supply for said circuits.

6. In a step-by-step mechanism, the combination with a movable element, means for operating it, a motor magnet for actuating said means and a local circuit for said magnet having a set of normally closed contacts and a set of normally open contacts, of a normally open operating circuit, means for closing it and a device for subsequently transmitting successive impulses of current over said circuit, a controlling relay and a secondary relay both adapted to be energized upon the closing of the operating circuit which respectively open and close the contacts in the motor magnet circuit, the secondary relay operating conjointly with the controlling relay to maintain its set of contacts in the closed position during the subsequent and successive opening and closing of the operating circuit and a source of current supply.

7. In a step-by-step mechanism, the combination with a movable element, means for advancing it and a motor magnet for actuating said means, two relays having different time constants, each controlling a set of contacts, those of the more rapidly operating relay being normally closed and those of the slower relay being normally open and a circuit for the motor magnet leading through said contacts, of an operating circuit leading to the more rapidly operating relay and a circuit controlled by the latter leading to the slower relay, means for sending impulses of current over the operating circuit and a source of current supply for said circuits.

8. In a step-by-step mechanism, the combination with a movable element, means for advancing it and a motor magnet for actuating said means, two relays one of which is adapted to respond to impulses of current quicker than the other, a set of normally closed contacts adapted to be opened by the quick relay and a set of normally open contacts adapted to be closed by the slower relay, of a circuit for the latter controlled by the quick relay, an operating circuit leading to the latter, means for sending impulses of current thereover and a source of current supply for said circuits.

9. In a step-by-step mechanism, the combination with a movable element, means for operating it and a motor magnet for actuating said means, a circuit for said magnet having a set of normally closed contacts and a set of normally open contacts, a relay for closing the latter set and a second relay for opening the former set which operates in response to impulses of current with greater rapidity than the other relay whereby its contacts may be opened and closed before the contacts of the other relay can be opened, of a circuit for the slower relay having a set of contacts controlled by the faster relay which are opened when the corresponding set of contacts of the motor magnet circuits are opened, an operating circuit leading to the more rapidly operating relay, means for transmitting impulses of current over said circuit and a source of current supply for said circuits.

10. In a step-by-step mechanism, the combination with a movable element, means for operating it and a motor magnet for actuating said means, two relays one of which responds to impulses of current more rapidly than the other, two sets of normally closed contacts controlled by the quick relay and a single set of normally open contacts controlled by the slower relay, of a circuit for the latter leading through one of the sets of closed contacts, a circuit for the motor magnet leading through the other set of closed contacts and the set of normally open contacts, a normally open operating circuit leading to the quick relay, means for closing and opening it to cause a corresponding opening and closing of the motor magnet circuit and the circuit of the slower relay and a source of current supply for said circuits.

11. In a step-by-step mechanism, the combination with a movable element, means for operating it and a motor magnet for actuating said means, of two relays having different time constants each controlling different sets of contacts, an operating circuit controlling the faster relay, means for rendering the slower relay responsive in unison with the first impulse of current on the operating circuit, a circuit for said relay controlled by the faster relay after it has been made responsive, a local circuit for the motor magnet leading through the sets of contacts of the two relays which is energized in unison with the second impulse of current on the operating circuit and a source of current supply for said circuits.

12. In a switching mechanism for automatic telephone systems, comprising a movable element and means for operating it, the combination with a motor magnet for actuating said means and a circuit therefor having two openings, of a telephone instrument having the normally open receiver hook contacts, an operating circuit leading through said contacts and an impulse transmitter also arranged in said circuit and adapted to alternately open and close it and retain said circuit closed on the termination of the impulses on said circuit, a relay energized by the operating circuit for opening and closing one set of contacts in the circuit of the motor magnet, a second relay controlled by the first for closing the other set of contacts in the motor magnet circuit which operates conjointly with the first relay to close its contacts upon the closing of the operating circuit in the first instance and to hold them closed during the transmission of successive impulses of current on the operating circuit and to open said contacts upon the cessation of said impulses, and a source of current supply for said circuits.

13. In a step-by-step mechanism, the combination with a movable element, means for operating it and a motor magnet actuating said means, a circuit therefor having normally open and normally closed sets of contacts and separate relays for opening the closed contacts and closing the open contacts, of an operating circuit leading through the relay controlling the normally closed contacts and means for sending impulses of current over said circuit, a starting circuit for the relay controlling the normally open set of contacts in the motor magnet circuit having contacts which are closed when the movable element is in its normal position and another set of contacts which are normally open, a holding circuit for the last mentioned relay controlled by the other relay, a third relay controlled by the latter for closing the set of open contacts in the starting circuit and a source of current supply for said circuits.

14. In a step-by-step mechanism, the combination with a movable element, means for operating it and a motor magnet actuating said means, a circuit therefor having normally open and normally closed sets of contacts and separate relays for opening the closed contacts and closing the open contacts, of an operating circuit leading through the relay controlling the normally closed contacts and means for sending impulses of current over said circuit, a starting circuit for the relay controlling the normally open set of contacts in the motor magnet circuit, said circuit having a set of contacts which are closed when the movable element is in its normal position and another set of contacts which are normally open, a holding circuit having one opening adapted to be closed upon the energizing of the starting circuit and provided with a set of normally closed contacts which are opened by the relay in the operating circuit, a third relay controlled by the operating circuit relay to close the opening in the starting circuit and a source of current supply for said circuits.

15. In a step-by-step mechanism, the combination with a movable element, means for operating it and a motor magnet actuating said means, a circuit therefor having two sets of contacts, two separate relays controlling them, an operating circuit leading through one of the relays and means for sending impulses of current thereover, of a starting circuit and a holding circuit for the other relay, said starting circuit having a set of normally open contacts, the holding circuit being provided with normally closed contacts adapted to be opened by the operating circuit relay and normally open contacts adapted to be closed by the energizing of the other relay, a third relay energized by the first controlling the closing of the starting circuit and a source of current supply for said circuits.

16. In a step-by-step mechanism, the combination with a movable element, means for operating it and a motor magnet actuating said means, a circuit therefor having two sets of contacts, two separate relays controlling them; an operating circuit leading through one of the relays and means for sending impulses of current thereover, of a starting circuit for the other relay having contacts which are closed only when the movable element is in its normal position and also provided with another set of contacts which are normally open, a holding circuit having contacts which are adapted to be opened by the operating circuit relay and other contacts adapted to be closed upon the energizing of the other relay by current on the starting circuit, a third relay for closing the opening in the starting circuit having a circuit which is controlled by the relay in the operating circuit and a source of current supply for said circuits.

17. In a step-by-step mechanism, the combination with a movable element, means for operating it and a motor magnet actuating said means, a circuit therefor having two sets of contacts, two separate relays having different time constants controlling said contacts, an operating circuit leading through the quick relay and means for sending impulses of current thereover, of a starting circuit for the slower relay having an opening and which is further controlled by the movable element and is capable of being energized only when said element is in its normal position, a holding circuit having an opening adapted to be closed upon the energizing of the slower relay and contacts adapted to be opened by the quick relay, a third relay having a circuit controlled by the quick relay which governs the opening in the starting circuit and a source of current supply for said circuits.

18. In a step-by-step mechanism, the combination with a movable element, means for operating it and a motor magnet actuating said means, a circuit therefor having normally open and normally closed sets of contacts and separate relays for opening the closed contacts and closing the open contacts, said relays having different time constants, of an operating circuit leading through the quick relay controlling the normally closed contacts, means for sending impulses of current thereover, a normally open starting circuit for the slower relay, a holding circuit for the latter which is closed by the slower relay and opened by the quick relay, a third relay controlled by the quick relay for closing the starting circuit and a source of current supply for said circuits.

19. In a step-by-step mechanism, the combination with a movable element, means for operating it and a motor magnet actuating said means, a circuit therefor having normally open and normally closed sets of contacts, two separate relays having different time constants, the relay responding to impulses of current with greater rapidity controlling the normally closed contacts while the slower relay controls the normally open contacts, a circuit for the slower relay having normally open contacts, a third relay controlling the latter having a circuit which is closed by the energizing of the quick relay means for sending current impulses and a source of current supply for said circuits.

20. In a step-by-step mechanism, the combination with a movable element, means for operating it and a motor magnet actuating said means, of three relays one of which is quicker than the others by being responsive to impulses of current with greater rapidity than said other relays, an operating circuit leading to the quick relay and means for sending impulses of current thereover, a circuit for one of the slower relays completed when the quick relay is energized, a circuit for the other slower relay completed by the energizing of the second mentioned relay, an operating circuit for the motor magnet having a set of contacts adapted to be closed by the third mentioned relay and another set of contacts to be opened by the quick relay and a source of current supply for said circuits.

21. In a step by step mechanism, the combination with a movable element, means for operating it, a motor magnet for actuating said means and a locking device, of a releasing magnet for disengaging it, a circuit for the motor magnet having normally open contacts and a circuit for the release magnet having normally closed contacts, a relay for closing the motor magnet circuit and opening that of the release magnet, a normally open circuit for said relay, means for closing it and a source of current supply for said circuits.

22. In a step-by-step mechanism, the combination with a movable element, means for operating it, a motor magnet actuating said means and a locking device, of a magnet for releasing it, a contact closed by the movable element when the latter is in its normal position and a second contact closed when said element is in adjusted position, a circuit for the motor magnet having a normally open set of contacts and a circuit for the release magnet having a normally closed set of contacts which also leads through said second contact and is closed by the adjustment of the movable element, a relay controlling the sets of contacts in the circuits of the motor and release magnets for alternately closing the former and opening the latter, a circuit for said relay leading through the first mentioned contact which latter is closed when the movable element is in its normal position, means for energizing the relay circuit and a source of current supply for said circuits.

23. In a step-by-step mechanism, the combination with a movable element, means for operating it, a motor magnet actuating said means and a locking device, of a magnet for releasing it, of two contacts alternately opened and closed by the movable element, a circuit for the motor magnet having normally open contacts and a circuit for the release magnet having normally closed contacts and also leading through the contact which is closed when the movable element is adjusted out of its normal position, a relay for closing the contacts of the motor magnet circuit and opening those of the release magnet, a circuit for said relay having normally open contacts and also leading through the contact which is closed when the movable element is in its normal position, means for closing the contacts of said relay circuit and a source of current supply for said circuits.

24. In a step-by-step mechanism, the combination with a movable element, means for operating it, a motor magnet actuating said means and a locking device, of a magnet for releasing it, circuits for the motor and release magnets, the former having normally open contacts and the latter normally closed contacts, a relay for reversing the position of said contacts, a normally open circuit for the relay, means for closing and opening said circuit, a source of current supply for said circuits and means for interrupting the current in the release magnet circuit.

25. In a step-by-step mechanism, the combination with a movable element, means for operating it, a motor magnet actuating said means and a locking device, of a magnet for releasing it, circuits for the motor and release magnets, the former having normally open contacts and the latter normally closed contacts, a relay for reversing the position of said contacts, a circuit for the relay having two openings, one of which is closed only when the movable element is in its normal position, means for closing the other opening in the relay circuit, a second contact in the release magnet circuit which is closed only when the relay circuit is broken by the movable element, a source of current supply for said circuits and means for interrupting the current supplied to the release magnet circuit.

26. In a step-by-step mechanism, the combination with a movable element, means for operating it, a motor magnet actuating said means and a locking device, of a magnet for releasing it, circuits for the motor and release magnets, a motor magnet relay controlling both circuits to alternately open and close them, a starting circuit for said relay, a release magnet relay controlling the starting circuit and also the release magnet circuit to open the latter when the starting circuit is closed, a main controlling relay, an operating circuit therefor, a circuit for the release magnet relay and a holding circuit for the motor magnet relay, both of said relay circuits being controlled by said main controlling relay and a source of current supply for said circuits.

27. The combination with a telephone circuit, a telephone instrument thereon having normally open contacts adapted to be closed when said instrument is in use, and a transmitter for sending impulses of current over said circuit, of switching mechanism comprising a movable element, means for operating it and a device for locking it, a motor magnet for actuating said means and a magnet for releasing said locking device, circuits for the motor and release magnets, a relay associated with the motor magnet controlling both circuits, a starting circuit for said relay, a second relay associated with the release magnet which controls the starting circuit and also the release magnet circuit, a circuit for the last mentioned relay and a holding circuit for the motor magnet relay, a main controlling relay energized by the telephone circuit and controlling the two last mentioned circuits and a source of current supply for said circuits.

28. The combination with a telephone circuit, a telephone instrument thereon having normally open contacts adapted to be closed when said instrument is in use, and a transmitter for sending impulses of current over said circuit, of switching mechanism comprising a movable element, means for operating it and a device for locking it, a motor magnet for actuating said means and a magnet for releasing said locking device, circuits for the motor and release magnets, a relay associated with the motor magnet controlling both circuits, a starting circuit for said relay, which is rendered operative only when the movable element is in its normal position, a second relay associated with the release magnet which controls the starting circuit, a circuit for the last mentioned relay and a holding circuit for the motor magnet relay, a primary relay energized by the telephone circuit controlling the two last mentioned circuits and a source of current supply for said circuits.

29. In an automatic telephone system, a progressively movable switching mechanism, comprising a motor magnet and two relays controlling the operation of said motor magnet, one of which relays responds to impulses of current with greater rapidity than the other, in combination with a telephone instrument metallic circuit, and means for despatching current impulses thereover to operate said relays.

30. In an automatic telephone system, a progressively movable switching mechanism comprising a motor magnet having a circuit and two relays operating conjointly to control said circuit, one of which responds to impulses of current with less rapidity than the other and is retained in energized condition during the energizing and deenergizing of the more rapid relay by impulses of current transmitted successively and with given regularity in combination with a telephone instrument circuit and means for despatching current impulses thereover.

31. In an automatic telephone system, a progressively movable switching mechanism, comprising a motor magnet having a circuit and two switching relays both controlling contacts in said circuit one of said relays being adapted in response to current impulses to open and close contacts in said circuit and the other being adapted in response to current impulses to close other contacts in the circuit and hold them closed during the operation of the first mention relay in combination with a telephone instrument circuit and means for despatching current impulses thereover.

32. In an automatic telephone system, the combination with a progressively movable switching mechanism comprising a motor magnet having a normally open circuit provided with two sets of contacts and two relays controlling them, one of said relays being adapted in response to current impulses to vibrate one set of contacts to successively open and close them and the other being adapted in response to current impulses to close and maintain the other set of contacts in closed position during the vibration of the first mention contacts, of a telephone instrument circuit and means for despatching current impulses thereover.

33. In an automatic telephone system, a progressively movable switching mechanism comprising a motor device which is normally inoperative and means embodying two parts which operate conjointly by current impulses to render the motor device operative, one of said parts being adapted to cause a continued actuation thereof in response to said impulses, in combination with a telephone instrument circuit and means for transmitting current impulses thereover to control the conjointly operating parts.

34. In an automatic telephone system, a progressively movable switching mechanism comprising a normally inoperative motor device and means embodying two parts which operate conjointly by current impulses to render the motor device operative, one of said parts being adapted to be operated to cause a continued actuation of the motor device, the other part being adapted to operate independently to subsequently render the motor device inoperative upon cessation of its actuation, in combination with a telephone instrument metallic circuit and means for transmitting current impulses thereover to control the conjointly operating parts.

35. In an automatic telephone system, a progressively movable switching mechanism comprising a normally inoperative motor magnet and two relays operating conjointly by current impulses to render said motor magnet operative, one of said relays being adapted to be operated to cause a continued operation of the motor magnet and the other relay being adapted to operate independently to render the motor magnet inoperative upon the cessation of its operation, and a telephone instrument circuit associated with the two relays and means for transmitting impulses of current thereover to control the operation of said relays.

36. In an automatic telephone system, a progressively movable switching mechanism comprising a normally inoperative motor magnet and two relays associated therewith having different time constants which operate conjointly by current impulses to render said magnet operative, one of said relays being adapted to subsequently operate, while the other remains in operated position to actuate the motor magnet, in combination with a telephone instrument metallic circuit and means for transmitting impulses of current thereover to control the operation of said relays.

37. In an automatic telephone system, a progressively movable switching mechanism comprising a motor magnet which is normally deenergized and inoperative and two normally deenergized relays controlling its operation which are adapted to operate conjointly when energized to render the motor magnet operative, one of said relays being adapted to be deenergized independently of the other to operate the motor magnet by causing it to become energized, in combination with a telephone instrument circuit, means for transmitting impulses of current thereover, and a source of current supply for said magnet and relays.

38. In an automatic telephone system, a progressively movable switching mechanism comprising a normally deenergized motor magnet and two normally inactive relays which are adapted to be excited and by their conjoint operation render the motor magnet in condition to be operated, one of said relays being adapted to be deenergized while the other relay is retained in energized condition to permit the motor magnet to be energized, of a telephone instrument circuit and means for transmitting impulses of current thereover and a source of current supply for the magnet and relays.

39. In an automatic telephone system, a progressively movable switching mechanism comprising a normally inoperative motor magnet, having a circuit provided with two sets of contacts and separate devices controlling the motor magnet which operate conjointly to simultaneously open one set of contacts and close the other, one of said devices being adapted to close the contacts controlled by it while the other device holds its contacts closed, a source of current supply, and a telephone instrument circuit and means for transmitting impulses of current thereover to operate the devices controlling the motor magnet.

40. In an automatic telephone system, a progressively movable switching mechanism comprising a normally inoperative motor magnet a circuit therefor and two relays having different time constants which control said circuit, the slower relay acting to place the circuit in condition to receive current impulses and the more rapidly operating relay acting to supply current impulses thereto, in combination with a telephone metallic circuit and means for despatching current impulses thereover to operate said relays.

41. In an automatic telephone system, a progressively movable switching mechanism comprising a motor magnet having a circuit provided with normally closed and normally open sets of contacts and two relays cooperating with said sets of contacts to reverse their condition, one of the relays being adapted to release its contacts and the other to hold its set of contacts in operated position during the movement of the released contacts in combination with a telephone circuit and means for transmitting impulses of current thereover to control the operation of said relay and a source of current supply thereover.

42. In an automatic telephone system, progressively movable switching mechanism comprising a motor magnet having a circuit provided with normally closed and normally open sets of contacts, relays having different time constants, the more rapidly operating relay cooperating with the normally closed set of contacts and the slower relay cooperating with the normally open set of contacts, means for primarily energizing both relays, to reverse the condition of the contacts in combination with a telephone circuit, and means for despatching current impulses thereover to control said relays and a source of current supply therefor.

43. A progressively movable mechanism comprising a normally inoperative motor device and electromagnetic mechanism for controlling its movement in unison with successive current impulses of given frequency, means for first rendering the motor device operative and secondly causing it to respond to said controlling mechanism only during the transmission of such impulses and means for producing the latter.

44. The combination with an impulse transmitter, of a progressively movable mechanism comprising a normally inoperative motor magnet, electromagnetic mechanism governed by current impulses despatched by the transmitter, which is adapted to control the operation of the motor magnet in synchronism with said impulses and means controlled by said impulses for rendering and retaining the motor magnet operative only during the transmission of successive current impulses of given regularity and a source of current supply.

45. The combination with an impulse transmitter, a progressively movable mechanism comprising a normally inoperative motor magnet and an electromagnet device adapted to control the operation of the motor magnet in synchronism with current impulses despatched by the transmitter, of a normally open circuit connecting the latter with said device, means actuated when said circuit is closed for rendering and retaining the motor magnet operative only during the continuous current impulses and a source of current supply.

46. The combination with a normally open operating circuit, an impulse transmitter arranged therein, a progressively movable switching mechanism comprising a normally inoperative motor magnet and an electromagnetic device which is adapted to control the operation of the motor magnet in synchronism with current impulses by the transmitter, of means actuated upon the closing of the operating circuit for rendering the motor magnet operative, said means being adapted to retain said magnet in operative condition only during the transmission of successive current impulses of given frequency over said circuit.

47. The combination with an operating circuit, an impulse transmitter arranged therein, a progressively movable mechanism comprising a normally inoperative motor magnet, a switching relay adapted to control the operation of the motor magnet in synchronism with current impulses despatched by the transmitter, of a second switching relay which is rendered active by the first mentioned relay and is retained in active condition during the transmission of current impulses, said second relay when active rendering the motor magnet operative.

48. In an automatic telephone system, a progressively movable switch comprising a motor magnet, a circuit for said magnet, electromagnetic devices for opening and closing said motor magnet circuit at two points, and circuits for said devices having therein means for transmitting current impulses thereover one device being adapted to hold the motor magnet circuit closed at one point under the influence of said impulses while the other device opens and closes said motor magnet circuit at the other point in response to said impulses.

49. The combination with a normally open operating circuit an impulse transmitter arranged therein and a progressively movable mechanism comprising a normally inoperative motor magnet, a circuit for said magnet, electromagnetic devices for opening and closing said circuit at two points, said electric magnetic devices being adapted to respond to impulses of current transmitted over the operating circuit one of said devices being adapted to hold the motor magnet device closed at one point under the influence of said impulses while the other device opens and closes said motor magnet in response to said impulses.

50. In a telephone system, an automatic switch, a release magnet, a slow-acting relay, a line relay, an energizing circuit for said release magnet, and a switch shaft, said energizing circuit adapted to be closed whenever the switch shaft is off normal and the line and slow-acting relays are deenergized.

51. A telephone system comprising a relay, a suitable source of current, means for closing a circuit to energize said relay, a second relay slow to release its armature relative to said first relay and controlled through contacts of said first relay, a third relay also slow to release its armature and jointly controlled by said first and second relays, means for intermittently and rapidly interrupting the energizing circuit of said first relay to cause its intermittent deenergization without deenergizing said second and third relays, and circuits controlled by said relays.

52. A telephone system including a primary relay, a suitable source of current, a secondary relay slow to release its armature relative to said first relay, means for closing a circuit to actuate said primary relay, connections whereby said secondary relay is actuated in consequence of the actuation of said primary relay, and a control circuit extending through contacts of said relays.

53. An automatic switch for telephone systems comprising wipers and cooperating contacts, a suitable source of current, a driving magnet for said wipers, primary and secondary control relays, the secondary relay being slow to release its armature relative to said primary relay, means for closing a circuit to actuate said primary relay, connections whereby said secondary relay is actuated in consequence of the actuation of said primary relay, and a control circuit for said driving magnet extending through contacts of said relays.

54. A telephone system comprising a telephone line, a suitable source of current, a calling device connected to said line at one point, a primary relay connected to said line at another point, a secondary relay actuated over a local circuit controlled by said primary relay, means for rendering said secondary relay slow to release its armature relative to said primary relay, and an impulse repeating circuit extending through contacts of said relays and operative to repeat the impulses sent by said calling device.

55. A telephone exchange system comprising a telephone line extending from a central office to a distant point, a source of current in circuit with said line, manually controlled means at said distant point for interrupting the circuit of the line, other telephone lines, an electrically controlled switch at the central office for establishing connection between said line and said other lines, active contacts for said switch constituting terminals for said line, passive contacts for said switch constituting terminals for said other lines, restoring means for said switch, means responsive to short interruptions of the circuit of said line for causing a primary operation of said switch, and a controlling relay for said switch responsive only to long interruptions of the circuit of said line.

56. A telephone exchange system comprising a telephone line extending from a central office to a distant point, a source of current in circuit with said line, manually controlled means at said distant point for interrupting the circuit of the line, other telephone lines, an electrically controlled switch at the central office for establishing connection between said line and said other lines, active contacts for said switch constituting terminals for said line, passive contacts for said switch constituting terminals for said other lines, restoring means for said switch, a controlling relay for said switch responsive to short interruptions of the circuit of said line, a second controlling relay for said switch responsive only to long interruptions of the circuit of said line, and means controlled by said relays for causing the operation of said switch.

57. A telephone exchange system comprising a telephone line extending from a central office to a distant point, a source of current in circuit with said line, manually controlled means at said distant point for interrupting the circuit of the line, other telephone lines, an electrically controlled switch at the central office for establishing connection between said line and said other lines, active contacts for said switch constituting terminals for said line, passive contacts for said switch constituting terminals for said other lines, restoring means for said switch, a controlling relay for said switch responsive to short interruptions of the circuit of said line, a second controlling relay for said switch responsive only to long interruptions of the circuit of said line, means controlled by said relays for causing the operation of said switch, and means controlled by said second relay for causing the operation of said restoring means.

58. In a telephone system, a switching mechanism provided with a release magnet, and having quick and slow acting relays controlling the said magnet, the quick acting relay holding circuit open through said magnet during conversation, and the slow acting relay holding said circuit open while operating impulses are being transmitted.

59. In a telephone system, a switch, means for releasing the same including a relay slow to release controlling a release magnet during the operation of the switch, and a quick acting relay controlling the release independently of said slow relay after the switch has operated, and means for controlling the two sides of a calling line in series to operate said switch.

60. A telephone system comprising a connector switch, a line relay therefor, a release magnet, means whereby if the line relay is de-energized momentarily the release magnet is prevented from energizing, and means whereby if the line relay de-energizes for a greater length of time the release magnet energizes and releases the said connector switch.

61. A telephone system comprising a connector switch, a release magnet therefor, a slow acting relay, a line relay, and a shaft for said switch, an energizing circuit for said slow acting relay controlled by said line relay, and an energizing circuit for said release magnet controlled by said slow acting relay and by said shaft, means whereby if said line relay de-energizes said slow acting relay de-energizes and sets up an energizing circuit through said release magnet to release said shaft to in turn destroy the energizing circuit for the said release magnet.

62. In a telephone system, a connector provided with a release magnet, and having quick and slow acting relays controlling said magnet, the quick acting relay holding circuit open through said magnet during conversation, and the slow acting relay holding said circuit open while the operating impulses are being transmitted.

63. In a telephone system, a switch, means for releasing the same including a release magnet and a relay slow to release its armature, said relay controlling the release magnet during the operation of the switch, a quick-acting relay controlling the release magnet after the switch has operated independently of said slow relay, and a central source of talking and operating current for said system.

64. In a telephone system, a switch, means including a release magnet and a release magnet circuit for releasing the same, a slow-acting relay controlling the release magnet circuit during the operation of the switch, and a quick-acting relay controlling the release magnet circuit independently of said slow-acting relay after the switch has operated.

65. In a telephone system, a progressively movable automatic switch provided with a release magnet, and having quick and slow acting relays controlling the said magnet, the quick acting relay holding circuit open through said magnet during conversation, and the slow acting relay holding said circuit open while operating impulses are being transmitted.

66. In a telephone system, a switch having a line relay and a relatively slow acting relay for controlling operations of said switch, whereby said relay is not operated by the impulses for operating said switch.

67. In a telephone system, a switch comprising a line relay and a plurality of relatively slow-acting relays for controlling operations of the switch, whereby said relays are not operated by the impulses for operating said switch.

68. A telephone exchange system comprising a telephone line extending from a central office to a distant point, a source of current in circuit with said line, manually controlled means at said distant point for interrupting the circuit of the line, other telephone lines, an electrically controlled switch at the central office for establishing connection between said line and said other lines, active contacts for said switch constituting terminals for said line, passive contacts for said switch constituting terminals for said other lines, restoring means for said switch, a controlling relay for said switch responsive to short interruptions of the circuit of said line, a second controlling relay for said switch responsive only to long interruptions of the circuit of said line, and means controlled by said second relay for causing the operation of said restoring means.

CHARLES L. GOODRUM.